(12) United States Patent
Govande et al.

(10) Patent No.: US 9,021,199 B2
(45) Date of Patent: Apr. 28, 2015

(54) METHODS AND STRUCTURE FOR NORMALIZING STORAGE PERFORMANCE ACROSS A PLURALITY OF LOGICAL VOLUMES

(75) Inventors: Nilesh S. Govande, Pune (IN); Jameer Babasaheb Mulani, Sangli (IN); Brad D. Besmer, Colorado Springs, CO (US); Susan Gray, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 214 days.

(21) Appl. No.: 13/586,133

(22) Filed: Aug. 15, 2012

(65) Prior Publication Data

US 2014/0052908 A1 Feb. 20, 2014

(51) Int. Cl.
*G06F 3/06* (2006.01)
*G06F 12/02* (2006.01)

(52) U.S. Cl.
CPC .............. *G06F 3/061* (2013.01); *G06F 3/0628* (2013.01); *G06F 3/0673* (2013.01); *G06F 12/02* (2013.01)

(58) Field of Classification Search
None
See application file for complete search history.

(56) References Cited

U.S. PATENT DOCUMENTS

| | | | |
|---|---|---|---|
| 3,343,133 A * | 9/1967 | Dirks | 711/112 |
| 5,758,345 A * | 5/1998 | Wang | 711/5 |
| 6,502,178 B1 * | 12/2002 | Olbrich | 711/202 |
| 6,990,437 B1 * | 1/2006 | Ata | 711/159 |
| 7,424,592 B1 | 9/2008 | Karr et al. | |
| 7,730,148 B1 * | 6/2010 | Mace et al. | 711/165 |
| 2003/0037061 A1 * | 2/2003 | Sastri et al. | 707/103 |
| 2003/0093619 A1 * | 5/2003 | Sugino et al. | 711/114 |
| 2003/0126321 A1 * | 7/2003 | Sinha | 710/38 |
| 2005/0080990 A1 | 4/2005 | Mereddy et al. | |
| 2007/0185902 A1 * | 8/2007 | Messinger et al. | 707/103 |
| 2008/0059694 A1 * | 3/2008 | Lee | 711/103 |
| 2008/0263306 A1 * | 10/2008 | Tanizawa | 711/170 |
| 2009/0013168 A1 | 1/2009 | Kalman et al. | |
| 2010/0332646 A1 * | 12/2010 | Balasubramanian et al. | 711/114 |
| 2011/0016272 A1 | 1/2011 | Jeong et al. | |
| 2011/0078405 A1 * | 3/2011 | Asano et al. | 711/170 |
| 2012/0124319 A1 | 5/2012 | Kirvan et al. | |
| 2013/0080715 A1 * | 3/2013 | Mori et al. | 711/154 |

OTHER PUBLICATIONS

Vanel et al. AIX Logical Volume Manager from A to Z: Troubleshooting and Commands. IBM Technical Support Organization, Dec. 1999.*

(Continued)

*Primary Examiner* — Daniel Bernard
(74) *Attorney, Agent, or Firm* — Duft Bornsen & Fettig LLP

(57) ABSTRACT

Methods and structure are disclosed for normalizing storage performance across a plurality of logical volumes. One embodiment is a storage controller. The storage controller is adapted to couple with a plurality of host systems and a storage device. The storage controller is adapted to receive one or more requests to create logical volumes for the plurality of hose systems, and adapted to identify a plurality of performance zones for storage areas of the storage device. The performance zones exhibit different performance criteria for one or more of: reading data from the storage device and writing data to the storage device. The storage controller is further adapted to allocate storage from each of the plurality of performance zones for each of the plurality of logical volumes such that the performance criteria for accessing the storage device is distributed substantially uniformly across the plurality of logical volumes.

20 Claims, 3 Drawing Sheets

(56) References Cited

OTHER PUBLICATIONS

IBM Corp. "Logical volume and disk I/O performance." AIX 5L Ver. 5.3 Performance Management, 7th ed., Oct. 2009.*

IBM Corp. "Organizing Logical Volumes to Increase I/O Performance." RS/6000 Technical Library, 1999-2001. <http://ps-2.kev009.com/wisclibrary/techlib/qna/faxes/>.*

* cited by examiner

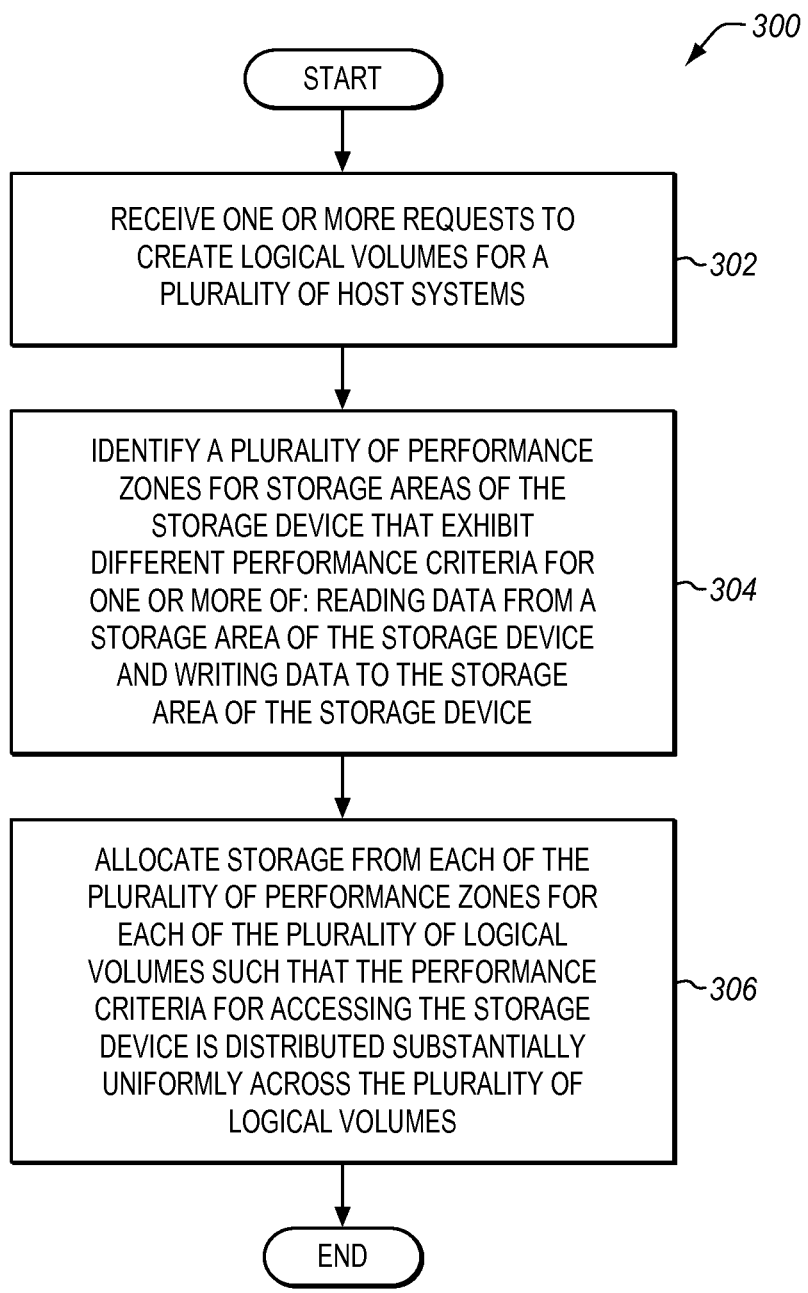

METHODS AND STRUCTURE FOR NORMALIZING STORAGE PERFORMANCE ACROSS A PLURALITY OF LOGICAL VOLUMES

BACKGROUND

1. Field of the Invention

The invention relates generally to the creation of logical volumes, and more specifically, relates to addressing performance variations that may exist across the logical volumes.

2. Discussion of Related Art

Storage systems typically include one or more host systems that are coupled with one or more storage devices. The host systems communicate with the storage devices via storage controller(s) to persistently store data on the storage devices. Storage space on the one or more storage devices may be allocated to provision storage capacity for one or more logical volumes. Logical volumes are a type of virtualized storage that may include a portion of one storage device or span across portions of multiple storage devices.

When a single storage device includes multiple logical volumes, variations may occur in the performance characteristics between the logical volumes based on where on a hard disk of the storage device the logical volumes are stored. The performance across the logical volumes is not normalized, or consistent between the logical volumes. This may primarily be due to variations in the read and write media rates associated with different portions of the rotating magnetic disks used to store the data for the logical volumes. Generally, the read and write media rates in a rotating magnetic disk system vary depending on the position of the read/write heads relative to a spindle at the center of the magnetic disk. For a fixed rotational rate and bit density, tracks along the radial outer edge of the magnetic disk have a higher performance characteristic than tracks along the radial inner edge of the magnetic disk, due to differences in the linear velocity of the disk relative to the read/write heads. Thus, different logical volumes on a storage device may exhibit different performance characteristics. This may also occur in cases where multiple logical volumes are striped across multiple storage devices in that each storage device may exhibit the same performance characteristic variations. Further, some recent developments in disk drives have incorporated flash memory components in addition to the traditional rotating magnetic (or optical) storage medium. In some such devices, the flash memory is merely used as a cache memory. However, in some such devices, the flash memory is a high performance portion of the total capacity of the storage device and represents a portion of the addressable range of logical blocks of the device. Thus, some such newer disk drives incorporating a hybrid of rotating storage media and flash memory storage media may exhibit still further performance characteristic variations.

Variations in the performance characteristics across multiple logical volumes may be problematic regardless of whether the logical volumes passively store data for the host systems or actively participate in booting and running the host systems. For example, a storage device may include a dozen or so bootable logical volumes that are each associated with a different host system. The respective host system boots an operating system from its respective logical volume during operation. However, problems may occur as each host system attempts to access its respective logical volume on the storage device. Problems related to data starvation (where some host systems experience slow read/write times at the storage device), excessive read/write head movement (as the storage device attempts to read data from different radial locations on the disk relative to the spindle), etc., may occur as the host systems attempt to access their respective logical volumes.

Thus it is an ongoing challenge to normalize the read/write storage performance across multiple logical volumes stored on a storage device.

SUMMARY

The present invention addresses the above and other problems, thereby advancing the state of the useful arts, by providing methods and structure for normalizing storage performance across a plurality of logical volumes utilizing different zones of storage area that exhibit different performance criteria. The different performance criteria include reading data from a storage area of a storage device and writing data to the storage area of the storage device. In response to receiving one or more requests to create a plurality of logical volumes using a storage device, a plurality performance zones for the storage device are identified. Storage is allocated from each of the plurality of performance zones for the plurality of logical volumes such that the performance criteria for accessing the storage device are distributed substantially uniformly across the plurality of logical volumes. Where a logical volume spans portions of multiple storage devices, each of the storage devices may be so enhanced to better normalize the performance criteria for all such logical volumes.

One embodiment is a storage controller. The storage controller includes an interface adapted to couple with a plurality of host systems and a storage device. The storage controller further includes a control system coupled with the interface. The control system is adapted to receive one or more requests to create logical volumes for the plurality of host systems, and adapted to identify a plurality of performance zones for storage areas of the storage device. The performance zones exhibit different performance criteria for one or more of: reading data from a storage area of the storage device and writing data to the storage area of the storage device. The control system is further adapted to allocate storage from each of the plurality of performance zones for each of the plurality of logical volumes such that the performance criteria for accessing the storage device is distributed substantially uniformly across the plurality of logical volumes.

Another embodiment is a method. The method is operable on a storage controller coupled with a plurality of host systems and a storage device. The method comprises receiving one or more requests to create logical volumes for the plurality of host systems. The method further comprises identifying a plurality of performance zones for storage areas of the storage device that exhibit different performance criteria for one or more of: reading data from a storage area of the storage device and writing data to the storage area of the storage device. The method further comprises allocating storage from each of the plurality of performance zones for each of the plurality of logical volumes such that the performance criteria for accessing the storage device is distributed substantially uniformly across the plurality of logical volumes.

Yet another embodiment is a non-transitory computer readable medium. The medium embodies programmed instructions, which when executed by a processor, are operable for performing a method in a storage controller coupled with a plurality of host systems and a storage device. The method comprises receiving one or more requests to create logical volumes for the plurality of host systems. The method further comprises identifying a plurality of performance zones for storage areas of the storage device that exhibit different performance criteria for one or more of: reading data from a storage area of the storage device and writing data to the storage area of the storage device. The method further comprises allocating storage from each of the plurality of performance zones for each of the plurality of logical volumes such that the performance criteria for accessing the storage device is distributed substantially uniformly across the plurality of logical volumes.

BRIEF DESCRIPTION OF THE DRAWINGS

FIG. 3 is a flowchart describing an exemplary method of normalizing storage performance across a plurality of logical volumes in accordance with features and aspects hereof.

DETAILED DESCRIPTION OF THE DRAWINGS

Figure 1:
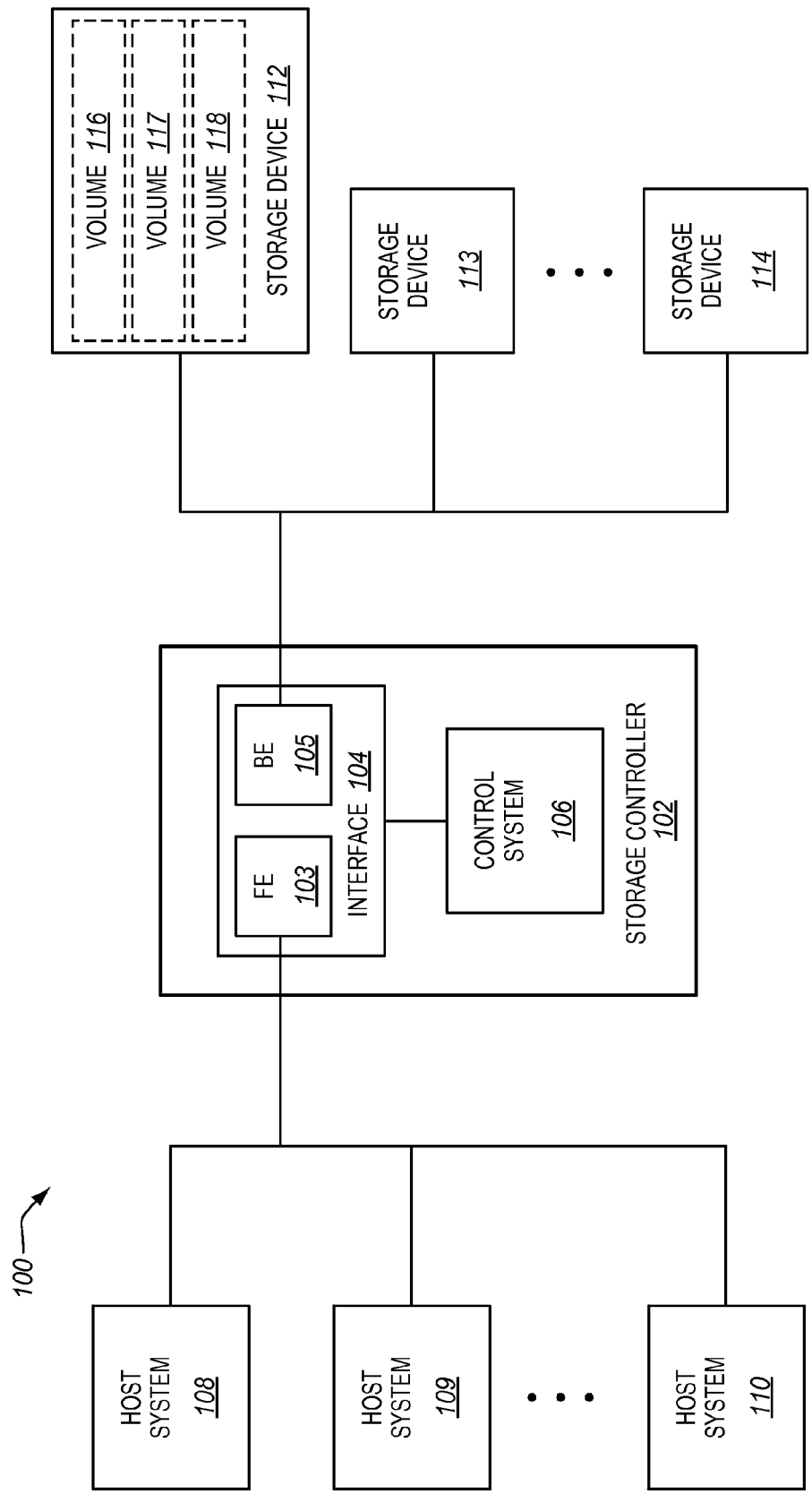
FIG. 1 is a block diagram of an exemplary storage system for normalizing storage performance across a plurality of logical volumes in accordance with features and aspects hereof.

FIG. 1 is a block diagram of an exemplary storage system 100 enhanced to normalize storage performance across a plurality of logical volumes 116-118 in accordance with features and aspects hereof. In this embodiment, storage system 100 includes a storage controller 102, a plurality of host systems 108-110, and one or more storage devices 112-114. Generally, storage devices 112-114 include one or more logical volumes. In this embodiment, storage device 112 includes logical volume 116, accessed by host system 108; logical volume 117, accessed by host system 109; and logical volume 118, accessed by host system 110. Although three logical volumes are illustrated in FIG. 1, one skilled in the art will recognize that storage devices 112-114 may include any number of logical volumes. Further, the logical volumes may be stored on one or more of the storage devices 112-114. For example, logical volumes may be striped across a plurality of storage devices 112-114. Therefore, the discussion of FIG. 1 is not intended to limit the scope of the claims to this particular embodiment.

Storage controller 102 includes an interface 104. Interface 104 includes a front-end interface 103 adapted to couple with host systems 108-110 and a back-end interface 105 adapted to couple with storage devices 112-114. Back-end interface 105 and front end interface 103 may communicate with storage devices 112-114 and host systems 108-110 using of a variety of protocols. For example, Serial Attached SCSI (SAS), Serial Advanced Technology Attachment (SATA), Fibre Channel, SCSI, etc. Storage controller 102 may be part of a host system (not shown in FIG. 1), and communicate with its attached host via various bus protocols, such as Peripheral Component Interconnect Express (PCIe), PCI-Extended (PCI-X), etc. Therefore, one skilled in the art will recognize that the protocols and busses used to implement storage controller 102 are merely design choices.

Figure 2:
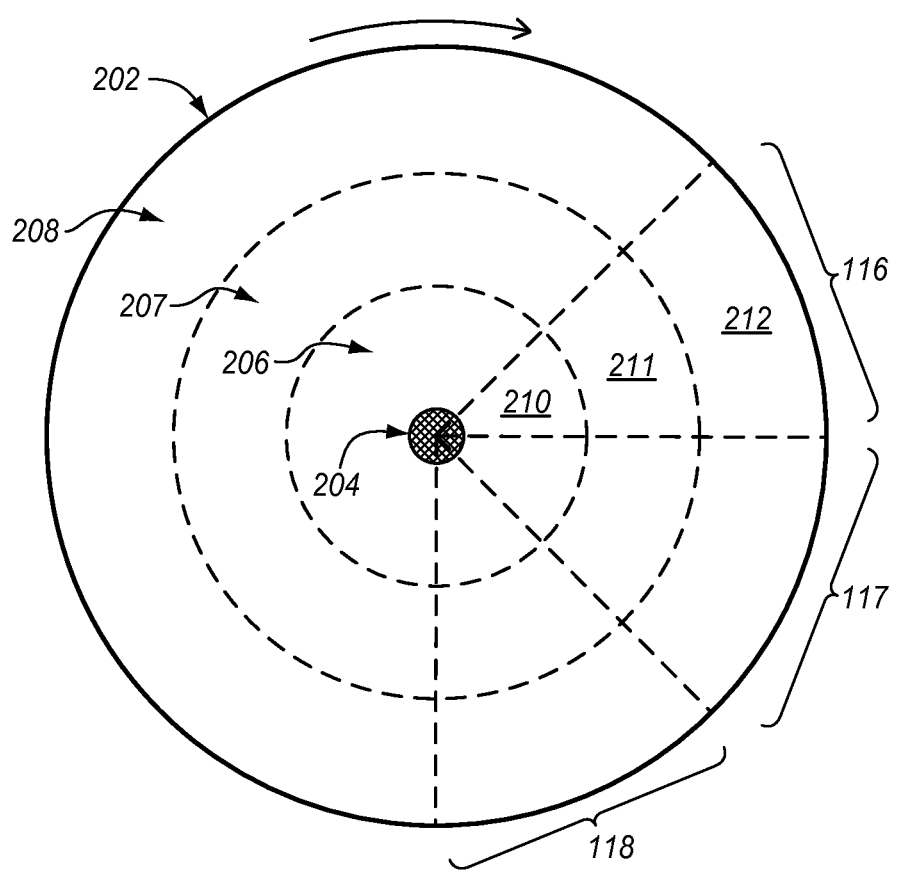
FIG. 2 illustrates a rotating hard disk of a storage device partitioned to include a plurality of performance zones for normalizing storage performance across a plurality of logical volumes in accordance with features and aspects hereof.

Storage controller 102 also includes a control system 106 coupled with interface 104. During operation, control system 106 receives one or more requests to create logical volumes for host systems 108-110, and allocates storage for the logical volumes such that performance criteria for accessing the logical volumes is distributed substantially uniformly across the logical volumes. For example, control system 106 may receive a request from host system 108 to create logical volume 116 to allow host system 108 to persistently store data at logical volume 116. Control system 106 identifies a plurality of performance zones for storage areas of a storage device (e.g., storage device 112) that exhibit different performance criteria. FIG. 2 illustrates a rotating hard disk surface 202 of a storage device (e.g., storage device 112) partitioned to include a plurality of performance zones for normalizing storage performance across a plurality of logical volumes in accordance with features and aspects hereof. Disk 202 rotates in the direction indicated by the arrow around a spindle 204. When disk 202 rotates at a constant angular velocity around spindle 204, disk 202 may exhibit different performance criteria depending on where data is stored on disk 202. For example, the linear velocity of disk 202 closest to spindle 204 (i.e., performance zone 206) is lower than the linear velocity of disk 202 farthest from spindle 204 (e.g., performance zone 208). In addition, data tracks closest to spindle 204 have a smaller circumference than data tracks farthest from spindle 204. Thus, more data may be written to tracks farthest from the spindle. This is particularly true when the bit density per inch for recording information on disk 202 is constant, which is typical. Thus, the media rate for reading/writing data from/to disk 202 is different depending on whether data is stored in performance zone 206 or performance zone 208. This may be problematic when a storage device includes a plurality of logical volumes, especially when the logical volumes are recorded as continuous linear blocks of storage. For example, if a storage device is partitioned to include a plurality of logical volumes, the logical volumes may start on the inside tracks closest to spindle 204 and end out near the outside edge of disk 202 in performance zone 208. Thus, some logical volumes are provisioned at high speed portions of disk 202, and other logical volumes are provisioned at low speed portions of disk 202. This is less desirable because the performance between different logical volumes may vary. Further, some recent developments in disk drives have incorporated flash memory components in addition to the traditional rotating magnetic (or optical) storage medium. In some such devices, the flash memory is merely used as a cache memory. However, in some such devices, the flash memory is a high performance portion of the total capacity of the storage device and represents a portion of the addressable range of logical blocks of the device. Thus, some such newer disk drives incorporating a hybrid of rotating storage media and flash memory storage media may exhibit still further performance characteristic variations. For example, such hybrid drives may be provisioned into high speed zones corresponding to the flash memory storage area and low speed zones corresponding to the rotating media storage area. Further still, Solid State Disks (SSDs) utilize flash memory to persistently store data. Such SSDs may also exhibit performance variations that are based on the number of memory channels available for accessing data on the flash memory, interleaved I/O requests for the flash memory, etc. Thus, such SSDs may be provisioned into high speed zones and low speed zones that generally are based on how the flash memory is accessed in the SSDs.

For storage controller 102 of FIG. 1, control system 106 identifies a plurality of performance zones 206-208 for storage areas of a storage device, such as storage device 112, that exhibit different performance criteria. Such criteria may include one or more of a media read rate from a storage area on disk 202 and a media write rate to a storage area on disk 202. In FIG. 2, there are three performance zones 206-208 illustrated, although one skilled in the art will recognize that any number of performance zones may be provisioned on disk 202 as a matter of design choice. In identifying a plurality of performance zones, control system 106 may perform a number of read/write tests to disk 202 and measure variations in read/write rates from the area around spindle 204 to an outer edge of disk 202. This may allow storage controller 102 to pre-determine the performance criteria for each of performance zones 206-208.

When creating a new logical volume, control system 106 allocates storage for the new logical volume on disk 202. However, instead of allocating the storage in some linear fashion (e.g., by simply allocating storage from one of the performance zones 206-208, control system 106 performs the allocation of storage capacity for the logical volume from each of the plurality of performance zones 206-208. For logical volume 116, this is illustrated on disk 202 as storage areas 210-212. Storage area 210 for logical volume 116 is within performance zone 206, which may also be referred to a low speed zone. Storage area 211 for logical volume 116 is within performance zone 207, which may also be referred to as an intermediate speed zone. Storage area 212 for logical volume 116 is within performance zone 208, which may also be referred to as a high speed zone. Thus, logical volume 116 includes storage areas 210-212 on disk 202 that exhibit different performance criteria, because each of storage areas 210-212 lie within different performance zones 206-208.

FIG. 2 also illustrates that logical volumes 117-118 are similarly configured in this embodiment. Logical volumes 117-118 include storage areas from zones 206-208. When storage areas on disk 202 are partitioned in this manner, the performance criteria for accessing disk 202 is likewise distributed substantially uniformly across logical volumes 116-118. This mitigates problems of some logical volumes residing substantially within high speed portions of disk 202, while other logical volumes reside substantially within low speed portions of disk 202.

The storage allocation scheme illustrated in FIG. 2 has other advantages as well. In this embodiment, each of logical volumes 116-118 is interleaved within the same performance zone. For example, logical volume 116 includes storage area 212 within high speed zone 208. Adjacent to storage area 212 is a storage area for logical volume 117. In like manner, a storage area for logical volume 118 is disposed next to the storage area for logical volume 117. As disk 202 rotates, a read/write head for disk 202 (not shown in FIG. 2) passes across logical volumes 116-118 in sequence. This may allow storage device 112 to respond to I/O requests for multiple logical volumes without excessive movement of the read/write heads for disk 202. For example, if logical volumes 116-118 are boot volumes for host systems 108-110, respectively, then the configuration illustrated in FIG. 2 may allow host systems 108-110 to rapidly boot without causing excessive movement of the read/write heads for disk 202 by storing start-up information on high speed zones, such as performance zone 208, and by interleaving logical volumes 116-118 across disk 202.

Another advantage of the storage allocation scheme illustrated in FIG. 2 relates to expanding storage capacity of an already existing logical volume. When control system 106 receives a request to expand a logical volume by some amount of storage, such as expanding logical volume 116, control system 106 may then allocate storage from one or more performance zones 206-208 that is based on some target performance criteria for accessing the new storage amount. For example, control system 106 may allocate storage from high speed zone 208 for database accesses, which may improve the performance of storage system 100, and may allocate storage from low speed zone 206 for log file accesses, which may be less important regarding performance for accessing disk 202.

FIG. 3 is a flowchart describing an exemplary method 300 of normalizing storage performance across a plurality of logical volumes in accordance with features and aspects hereof. Method 300 may be operable in a storage controller, such as previously described with respect to storage controller 102 of FIG. 1. Step 302 comprises receiving one or more requests to create logical volumes for a plurality of host systems. The requests may create bootable or non-bootable logical volumes for the host systems, and may be partitioned across one or more storage devices as a matter of design choice.

Step 304 comprises identifying a plurality of performance zones for storage areas of a storage device that exhibit different performance criteria. The performance criteria may include a bulk transfer rate from the storage device for reading data, a bulk transfer rate to the storage device for writing data, etc. Generally, a bulk transfer rate is a media rate to/from the actual disks used to persistently store data, in contrast to some high speed cache memory on the storage device. To identify a plurality of performance zones for the storage device, tests may be performed to measure the actual read/write speed to physical disks in the storage devices. Further, one or more pre-defined tables may be used to characterize the performance criteria for a particular storage device. Therefore, it may not be necessary to perform the performance testing when the capabilities of the storage devices are well characterized. Where multiple storage devices are present for creation/provisioning of the plurality of logical volume, a plurality of performance zones may be defined for each of the multiple storage devices. Where the multiple storage devices are homogeneous types/models (with substantially similar performance characteristics), the same performance zones may be defined for each of the multiple storage devices. Where different types/models of storage devices are present, each device may be defined with its preferred performance zones as desired for a particular application.

Step 306 comprises allocating storage from each of the plurality of performance zones (on each storage device used to provision the logical volume) for each of the plurality of logical volumes. When allocating storage, such allocations may be made based on distributing low speed performance zones and high speed performance zones substantially uniformly across the logical volumes. This allows for the performance criteria for accessing each of the logical volumes to be similar.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable on a storage controller coupled with a plurality of host systems and a storage device, the method comprising:

receiving one or more requests to create a plurality logical volumes for the plurality of host systems;

identifying a plurality of performance zones for storage areas of the storage device that exhibit different performance criteria for one or more of: reading data from a storage area of the storage device and writing data to the storage area of the storage device; and allocating storage from each of the plurality of performance zones for each of the plurality of logical volumes to normalize a storage performance across the plurality of logical volumes.

2. The method of claim 1 wherein the plurality of performance zones include:
   a low speed zone proximate to a spindle in a hard disk of the storage device; and
   a high speed zone corresponding to a flash memory storage area of the storage device.

3. The method of claim 1 wherein at least one of the plurality of logical volumes is a bootable volume that includes an operating system executable by one or more of the plurality of host systems.

4. The method of claim 1 wherein:
   the performance zones comprise a plurality of storage blocks allocated along a sequence of co-located tracks on a hard disk of the storage device; and
   the plurality of storage blocks are distributed across the plurality of logical volumes such that at least two of the plurality of the logical volumes may be accessed during one rotation of the hard disk.

5. The method of claim 1 wherein the method further comprises:
   receiving a request to expand a storage size of one of the plurality of logical volumes by a new amount of storage; and
   allocating storage from the plurality of performance zones based on a target performance criteria for accessing the new amount of storage.

6. The method of claim 1 wherein the plurality of performance zones include:
   a low speed zone proximate to a spindle in a hard disk of the storage device; and
   a high speed zone distal to the spindle.

7. The method of claim 6 wherein each of the plurality of logical volumes includes:
   at least one high speed zone; and
   at least one low speed zone.

8. A storage controller comprising:
   an interface adapted to couple with a plurality of host systems and a storage device; and
   a control system coupled with the interface, the control system adapted to receive one or more requests to create a plurality of logical volumes for the plurality of host systems, and adapted to identify a plurality of performance zones for storage areas of the storage device that exhibit different performance criteria for one or more of: reading data from a storage area of the storage device and writing data to the storage area of the storage device;
   the control system further adapted to allocate storage from each of the plurality of performance zones for each of the plurality of logical volumes to normalize a storage performance across the plurality of logical volumes.

9. The storage controller of claim 8 wherein the plurality of performance zones include:
   a low speed zone proximate to a spindle in a hard disk of the storage device; and
   a high speed zone corresponding to a flash memory storage area of the storage device.

10. The storage controller of claim 8 wherein at least one of the plurality of logical volumes is a bootable volume that includes an operating system executable by one or more of the plurality of host systems.

11. The storage controller of claim 8 wherein:
    the performance zones comprise a plurality of storage blocks allocated along a sequence of co-located tracks on a hard disk of the storage device; and
    the storage blocks are distributed across the plurality of logical volumes such that at least two of the plurality of the logical volumes may be accessed during one rotation of the hard disk.

12. The storage controller of claim 8 wherein:
    the control system is further adapted to receive a request to expand a storage size of one of the plurality of logical volumes by a new amount of storage, and is further adapted to allocate storage from the plurality of performance zones based on a target performance criteria for accessing the new amount of storage.

13. The storage controller of claim 8 wherein the plurality of performance zones include:
    a low speed zone proximate to a spindle in a hard disk of the storage device; and
    a high speed zone distal to the spindle.

14. The storage controller of claim 13 wherein each of the plurality of logical volumes includes:
    at least one high speed zone; and
    at least one low speed zone.

15. A non-transitory computer readable medium embodying programmed instructions which, when executed by a processor, are operable for performing a method in a storage controller coupled with a plurality of host systems and a storage device, the method comprising:
    receiving one or more requests to create a plurality of logical volumes for the plurality of host systems;
    identifying a plurality of performance zones for storage areas of the storage device that exhibit different performance criteria for one or more of: reading data from a storage area of the storage device and writing data to the storage area of the storage device; and
    allocating storage from each of the plurality of performance zones for each of the plurality of logical volumes to normalize a storage performance across the plurality of logical volumes.

16. The non-transitory computer readable medium of claim 15 wherein at least one of the plurality of logical volumes is a bootable volume that includes an operating system executable by one or more of the plurality of host systems.

17. The non-transitory computer readable medium of claim 15 wherein:
    the performance zones comprise a plurality of storage blocks allocated along a sequence of co-located tracks on a hard disk of the storage device; and
    the plurality of storage blocks are distributed across the plurality of logical volumes such that at least two of the plurality of the logical volumes may be accessed during one rotation of the hard disk.

18. The non-transitory computer readable medium of claim 15, wherein the method further comprises:
    receiving a request to expand a storage size of one of the plurality of logical volumes by a new amount of storage; and
    allocating storage from the plurality of performance zones based on a target performance criteria for accessing the new amount of storage.

19. The non-transitory computer readable medium of claim 15 wherein the plurality of performance zones include:
    a low speed zone proximate to a spindle in a hard disk of the storage device; and
    a high speed zone distal to the spindle.

20. The non-transitory computer readable medium of claim 19 wherein each of the plurality of logical volumes includes:
   at least one high speed zone; and
   at least one low speed zone.

* * * * *